(12) United States Patent
Benstead et al.

(10) Patent No.: US 10,711,104 B2
(45) Date of Patent: Jul. 14, 2020

(54) AMORPHOUS HIGH PERFORMANCE POLYAMIDE

(71) Applicant: Shakespeare Company LLC, Boca Raton, FL (US)

(72) Inventors: Michael Benstead, Cleveland (GB); Charles Richard Langrick, Middlesbrough (GB)

(73) Assignee: Shakespeare Company, LLC, Greer, SC (US)

( * ) Notice: Subject to any disclaimer, the term of this patent is extended or adjusted under 35 U.S.C. 154(b) by 0 days.

(21) Appl. No.: 15/310,603

(22) PCT Filed: May 14, 2015

(86) PCT No.: PCT/US2015/030767
§ 371 (c)(1),
(2) Date: Nov. 11, 2016

(87) PCT Pub. No.: WO2015/175775
PCT Pub. Date: Nov. 19, 2015

(65) Prior Publication Data
US 2017/0081473 A1 Mar. 23, 2017

Related U.S. Application Data

(60) Provisional application No. 61/993,094, filed on May 14, 2014, provisional application No. 62/034,417, filed on Aug. 7, 2014.

(51) Int. Cl.
*C08G 69/26* (2006.01)
*C08L 77/06* (2006.01)
*C08K 7/14* (2006.01)

(52) U.S. Cl.
CPC .......... *C08G 69/265* (2013.01); *C08G 69/26* (2013.01); *C08K 7/14* (2013.01); *C08L 77/06* (2013.01); *C08L 2205/02* (2013.01)

(58) Field of Classification Search
CPC ....... C08L 77/00; C08L 77/06; C08G 69/265; C08G 69/26
See application file for complete search history.

(56) References Cited

U.S. PATENT DOCUMENTS

| | | | |
|---|---|---|---|
| 4,111,921 A | 9/1978 | Bier et al. | |
| 4,163,101 A | 7/1979 | Schade et al. | |
| 5,109,106 A | 4/1992 | Lahary et al. | |
| 5,266,655 A | 11/1993 | Prevost et al. | |
| 6,207,276 B1 * | 3/2001 | Spindler | D01F 1/10 |
| | | | 139/383 A |
| 2012/0165466 A1 | 6/2012 | Nitto et al. | |
| 2013/0209784 A1 * | 8/2013 | Nakagawa | C08L 77/00 |
| | | | 428/314.8 |

FOREIGN PATENT DOCUMENTS

| | | |
|---|---|---|
| CN | 1166843 A | 12/1997 |
| EP | 2510056 B1 | 12/2013 |
| WO | 2015/175775 A1 | 11/2015 |

OTHER PUBLICATIONS

International Search Report and Written Opinion Received for PCT Patent Application No. PCT/US2015/030767, dated Aug. 5, 2015, 13 pages.
International Preliminary Report on Patentability Received for PCT Patent Application No. PCT/US2015/030767, dated Nov. 24, 2016, 11 pages.

\* cited by examiner

*Primary Examiner* — Gregory Listvoyb
(74) *Attorney, Agent, or Firm* — Eversheds Sutherland (US) LLP (57) ABSTRACT

The disclosure relates to an improved method of producing MPMD based amorphous, semi-aromatic polyamides in order to improve their mechanical properties. It also relates to improved formulations of these polyamides which have further improved mechanical properties by the incorporation of greater amounts of isophthalic acid. The disclosure relates to an improved method of producing MPMD based amorphous, semi-aromatic polyamides in order to improve their mechanical properties. It also relates to improved formulations of these polyamides which have further improved mechanical properties by the incorporation of greater amounts of isophthalic acid.

24 Claims, 6 Drawing Sheets

AMORPHOUS HIGH PERFORMANCE POLYAMIDE

CROSS-REFERENCE TO RELATED APPLICATIONS

This application claims the benefit of U.S. provisional application Ser. No. 61/993,094, filed May 14, 2014; and U.S. provisional application Ser. No. 62/034,417, filed Aug. 7, 2014, the disclosures of which are specifically incorporated herein by reference in their entireties.

FIELD OF THE INVENTION

The disclosure herein relates to an improved method of producing 2-methyl-1,5-pentamethylene diamine ("MPMD") based amorphous, semi-aromatic polyamides in order to improve their mechanical properties. It also relates to improved formulations of these polyamides which have further improved mechanical properties. Also disclosed are semi-aromatic polyamide melt blended polymer and an improved method of producing the blend, comprising a diamine/dicarboxylic acid based polyamide including MPMD and an aromatic diacid, terephthalic acid ("T") or isophthalic acid ("I"), blended with an aliphatic polyamide such as either or both of polyhexamethyleneadipamide (N66 or PA66) or polycaproamide (N6 or PA6). These disclosures further relate to articles or parts made from the nylon blended polymer, the partially crystalline articles having improved mechanical performance.

BACKGROUND OF THE INVENTION

It is a well-known aspect of polymer science that higher molecular weight polymers tend to have improved impact strengths than their lower molecular weight counterparts. This can have a significant impact on the end-use application of a polymer. MPMD containing polymers are known to suffer from difficulties in building molecular weight to a significant degree due to cyclisation of MPMD and its subsequent volatilization during the initial evaporation process of the polymerization cycle and end-capping of the polymer by the cyclized species (3-methylpiperidine), as disclosed in U.S patent application publication No. 2012/0165466 A1. Several efforts have been made in attempts to overcome this problem. However, these efforts do not seem sufficient to overcome this problem to a significant degree.

Also, very few MPMD based amorphous polyamides for use as molded articles have been disclosed. Due to the ever-present demand for new materials with differentiated properties, MPMD based copolymers provide a way to meet this demand.

A few references detail a significant number of amorphous polyamides based on hexamethylene diamine ("HMD") which generally have a higher isophthalic acid content and a lesser amount of terephthalic acid. The ability of MPMD to disrupt crystallization of the polymer allows for a wider range of formulations to be produced (varying amounts of terephthalic and isophthalic acid content) while retaining the amorphous nature of the polymer. This will, in turn, affect the polymers thermal and mechanical properties allowing it to be differentiated from what is already available and previously described in the art. Thus, need continues to exist in the amorphous polyamide art for improved MPMD based amorphous polyamide compositions with differentiated properties.

Improved mechanical performance applies in many end-use applications of the polymer and in particular to the injection molding end-use for the polymer. Polymers employed in injection molding such as polyamides, copolyamides and their blended formulation are no exception to this fact of mechanical performance improvement, as is appreciated by the skilled person.

Furthermore, it is known that blending nylons with amorphous semi-aromatic polyamides (e.g., a semi-aromatic copolyamide of poly-hexamethyleneisophthalamide and polyhexamethyleneterephthalamide called "6I/6T") can improve their retention of stiffness at temperatures above the glass transition temperature of the polyamide and up to about 100° C. However, due to the amorphous nature of the blend component, once above about 100° C., the stiffness is reduced to a level below that of the unblended nylon at the same temperature.

The mechanical performance of nylon (polyamide 6 and polyamide 66) is known to significantly drop-off above its glass transition temperatures ($T_g$). Off-setting this drop-off may be remedied by blending nylon with an amorphous partially aromatic polyamide, as described in U.S. Pat. No. 5,266,655. As a result, the mechanical performance is retained to a higher temperature above $T_5$.

Similarly, high temperature resistant polyamides of semi-aromatic and semi-crystalline copolyamides, which also contain terephthalic acid, are known from European Patent No. 2,510,056B1. However, there is still room for improvement in this field.

SUMMARY OF THE INVENTION

One aspect of the disclosed process is directed to a composition comprising a copolyamide containing about 40 to about 80 mol % 2-methyl-1,5-pentamethyleneterephthalamide ("MPMD-T") units and about 20 to about 60 mol % 2-methyl-1,5-pentamethyleneisophthalamide ("MPMD-I") units, wherein the copolyamide has a relative viscosity ("RV") of at least 1.90.

Another aspect of the disclosed process is directed to a molded article produced from the copolyamide of the disclosed process.

Another aspect of the disclosed process is directed to a method of making a copolyamide comprising MPMD with a mixture of isophthalic acid and terephthalic acid in the presence of a catalyst.

Another aspect of the disclosed process is directed to a method of making a conditioned article comprising:
  i) providing a copolyamide containing about 40 to about 80 mol % MPMD-T units and about 20 to about 60 mol % MPMD-I units;
  ii) producing an article from the copolyamide of i);
  iii) conditioning the article of ii); and
  iv) recovering the conditioned article from iii).

BRIEF DESCRIPTION OF THE FIGURES

To further clarify other advantages and features of the above aspects of this disclosure, the appended figures are provided as illustrative embodiments associated with the non-limiting examples which follow.

DETAILED DESCRIPTION OF THE INVENTION

Embodiments of the invention described and claimed herein are not to be limited in scope by the specific embodiments herein disclosed, since these embodiments are intended as illustration of several aspects of the disclosure. Any equivalent embodiments are intended to be within the scope of this disclosure. Indeed, various modifications of the embodiments in addition to those shown and described herein will become apparent to those skilled in the art from the foregoing description. Such modifications are also intended to fall within the scope of the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein. In addition, where features or aspects of the invention are described in terms of Markush groups, those skilled in the art will recognize that the invention is also thereby described in terms of any individual member or subgroup of members of the Markush group.

As used herein and in the appended claims, the singular forms "a," "an," and "the" include plural reference unless the context clearly dictates otherwise. Thus, for example, a reference to "a reactor" includes a plurality of reactors, such as in a series of reactors. In this document, the term "or" is used to refer to a nonexclusive or, such that "A or B" includes "A but not B," "B but not A," and "A and B," unless otherwise indicated.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "solvent" as used herein means a liquid medium that is generally regarded by one ordinarily skilled in the art as having the potential to be capable of solubilizing simple organic and/or inorganic substances.

The term "polyamide blend with MPMD-T/MPMD-I" as used herein refers to a polyamide blend comprising a MPMD-T/MPMD-I blend of the present disclosure. The MPMD-T/MPMD-I blend may also be referred to as DT/DI blend in the context of this disclosure.

All publications, including non-patent literature (e.g., scientific journal articles), patent application publications, and patents mentioned in this specification are incorporated by reference as if each were specifically and individually indicated to be incorporated by reference.

It is understood that the descriptions herein are intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," "third," and the like are used merely as labels, and are not intended to impose numerical requirements on their objects.

One aspect of the present disclosure is directed to a composition comprising a copolyamide containing about 40 to about 80 mol % MPMD-T units and about 20 to about 60 mol % MPMD-I units, wherein the copolyamide has a RV of at least 1.90. The term "RV" is the relative viscosity determined according to the ISO 307 (RV) method.

As shown in Table 1, in some embodiments, the copolyamide has a RV of at least 1.95 or 2.00. In Table 1, AEG is the Amine End Groups and $T_g$ is the Glass Transition temperature for the tested copolyamide. AEG and $T_g$ are determined according to the available industrial methods in polymer science.

TABLE 1

Analysis of Various MPMD-T/MPMD-I Formulations

| MPMD-T/MPMD-I Mole:mole | RV | AEG | $T_g$ (° C.) |
|---|---|---|---|
| 80:20 | 1.94 | 34 | 147 |
| 70:30 | 1.90 | 36 | 145 |
| 60:40 | 2.04 | 46 | 145 |
| 0:100 | 1.76 | 52 | 136 |

In some embodiments, the copolyamide contains about 50 to about 80 mol % MPMD-T units and about 20 to about 50 mol % MPMD-I units. In a further embodiment, the copolyamide contains about 50 to about 70 mol % MPMD-T units and about 30 to about 50 mol % MPMD-I units. In other embodiments, the copolyamide contains about 60 to about 80 mol % MPMD-T units and about 20 to about 40 mol % MPMD-I units. In some other embodiments, the copolyamide contains about 60 to about 70 mol % MPMD-T units and about 30 to about 40 mol % MPMD-I units.

As shown in Table 2, gradual increases of the isophthalic acid content have unexpected favorable effects on the mechanical properties of the polymer. The amorphous MPMD based polyamides detailed herein have improvements in both tensile strength and Izod impact strength.

Pascals (MPa) and notched Izod impact strength of 8.25 kiloJoules/sq·m ($kJ/m^2$) and 29 $kJ/m^2$ (unnotched). An amorphous MPMT based polyamide with a terephthalic acid to isophthalic acid ratio of 70:30 (molar) and RV of 1.90 displayed tensile strength of 82 MPa and Izod impact strength of 9.06 $kJ/m^2$ (notched) and 42 $kJ/m^2$ (unnotched). An amorphous MPMD based polyamide with a terephthalic acid to isophthalic acid ratio of 60:40 (molar) and RV of 2.04 displayed tensile strength of 102 MPa and Izod impact strength of 10.70 $kJ/m^2$ (notched) and 142 $kJ/m^2$ (unnotched).

In some embodiments, the copolyamide has a RV more than 1.95. In a further embodiment, the copolyamide has a RV more than 2.00.

In some embodiments, the tensile strength of the copolyamide is more than 80 MPa. In a further embodiment, the tensile strength of the copolyamide is more than 100 MPa.

In one embodiment, the notched Izod impact strength of the copolyamide is more than 5 $kJ/m^2$. In another embodiment, the notched Izod impact strength of the copolyamide is more than 7 $kJ/m^2$.

In some embodiments, the unnotched Izod impact strength of the copolyamide is more than 30 $kJ/m^2$. In other embodiments, the unnotched Izod impact strength of the copolyamide is more than 60 $kJ/m^2$.

TABLE 2

Mechanical Testing

| Property | Units | Temp. (° C.) | Method | 80:20 MPMD-T/MPMD-I (Example 1 Polymer) | 70:30 MPMD-T/MPMD-I (Example 2 Polymer) | 60:40 MPMD-T/MPMD-I (Example 3 Polymer) | 0:100 MPMD-T/MPMD-I (Example 4 Polymer) |
|---|---|---|---|---|---|---|---|
| Glass transition temperature ($T_g$) | ° C. | — | DSC | 147 | 145 | 145 | 136 |
| Heat deflection temperature (HDT, @ 1.8 MPa) | ° C. | — | ISO 75 | 122 | 121 | 122 | 117 |
| Tensile modulus | GPa | 23 | ISO 527 (1 mm/min) | 3.07 | 3.15 | 3.12 | 3.55 |
| Tensile strength | MPa | 23 | ISO 527 (50 mm/min) | 49 | 82 ± 11 | 102 (2 samples that yielded), 90 (3 samples that didn't yield) | 91 ± 13 |
| Tensile strain @ yield | % | 23 | ISO 527 (50 mm/min) | — | — | 6.7 (for two samples that yielded) | — |
| Tensile elongation (@ break) | % | 23 | ISO 527 (50 mm/min) | 2 | 3 | 8 ± 6 | 3 |
| Flexural modulus | GPa | 23 | ISO 178 (2 mm/min) | 3.1 | 3.14 | 3.15 | 3.54 |
| Flexural strength | MPa | 23 | ISO 178 (2 mm/min) | 137 | 140 | 140 | 159 |
| Izod impact strength (notched) | $kJ/m^2$ | 23 | ISO 180 | 8.25 | 9.06 ± 3 | 10.70 | 4.16 ± 3 |
| Izod impact strength (unnotched) | $kJ/m^2$ | 23 | ISO 180 | 29 ± 13 | 42 ± 19 | 142 ± 85 | 59 |
| Water absorption, 24 hr (@ 23° C., full immersion) | % | 23 | ISO 62 | 0.98 | 0.83 | 0.84 | 0.68 |

All data dry as-molded (DAM)

In Table 2, an amorphous MPMD based polyamide with a terephthalic acid to isophthalic acid ratio of 80:20 (molar) and RV of 1.94 displayed tensile strength of 49 Mega In some embodiments, the molded articles prepared from the copolyamides, according to the disclosed process, may be conditioned according to the ISO 1110 method.

As shown in Table 3, the copolyamide of the disclosed process exhibits improved tensile modulus and tensile strength after conditioning according to the ISO 1110 method. The conditioned copolyamide also exhibit improved flexural modulus and flexural strength than the unconditioned copolyamide.

TABLE 3

Mechanical Data Conditioned vs. Dry As-molded

| Property | Units | Temp. (° C.) | Method | 60:40 MPMD-T/MPMD-I | | 60:40 MPMD-T/MPMD-I | |
|---|---|---|---|---|---|---|---|
| RV | — | 25 | — | 1.92 | | 2.17 | |
| | | | | DAM | Cond | DAM | Cond |
| Glass transition temperature ($T_g$) | ° C. | — | DSC | 145 | | 145 | |
| HDT (1.8 MPa) | ° C. | — | ISO 75 | 122 | — | 122 | — |
| Tensile modulus | GPa | 23 | ISO 527 | 3.09 | 3.51 | 3.00 | 3.49 |
| Tensile strength | MPa | 23 | ISO 527 | 76 | 99 | 102 | 111 |
| Tensile strain @ yield | % | 23 | ISO 527 | — | — | 7.5 | 6.25 |
| Tensile elongation (@ break) | % | 23 | ISO 527 | 4 | 5.2 | 8.3 | 7.4 |
| Flexural modulus | GPa | 23 | ISO 178 | 2.88 | 3.29 | 2.86 | 3.19 |
| Flexural strength | MPa | 23 | ISO 178 | 130 | 145 | 128 | 143 |
| Izod impact strength (notched) | $kJ/m^2$ | 23 | ISO 180 | 8.7 | 4.2 | 6.7 | 4.3 |
| Izod impact strength (unnotched) | $kJ/m^2$ | 23 | ISO 180 | NB | 69 ± 52 | NB | 114 ± 63 |
| Charpy impact strength (notched) | $kJ/m^2$ | 23 | ISO 179 | 5.4 | 4.5 | 5.5 | 4.8 |
| Charpy impact strength (unnotched) | $kJ/m^2$ | 23 | ISO 179 | NB | Not tested** | NB | Not tested** |
| Water absorption, 24 hr (@ 23° C., full immersion) | % | 23 | ISO 62 | 0.94 | — | 0.97 | — |
| Water absorption at equilibrium (70° C., 62% RH) | % | 23 | ISO 1110 | — | 3.9 | — | 3.9 |
| Density | $g/cm^3$ | 23 | ISO 1183 | — | — | 1.18 | 1.19 |
| Transmission, visible | % | 23 | ASTM D1003 | — | — | 90.7 | — |
| Haze | % | 23 | ASTM D1003 | — | — | 4.6 | — |
| L*a*b color | — | 23 | ISO 7724-1 | — | — | 92.41 −0.01 −2.06 | — |

Standard deviations included where statistically significant
Cond = conditioned using ISO 1110 (70° C., 62% RH)
DAM = dry as-molded;
**Not tested due to lack of material In some embodiments, the copolyamide has a tensile modulus of more than 3.0 Giga Pascals (GPa). In a further embodiment, the copolyamide has a tensile modulus of more than 3.1, 3.2, 3.3, or 3.4 GPa.

In some embodiments, the copolyamide has a flexural modulus of more than 3.00 GPa. In a further embodiment, the copolyamide has a flexural modulus of more than 3.10, 3.20, 3.30, or 3.40 GPa.

In some embodiments, the copolyamide has a flexural strength of more than 130 MPa. In a further embodiment, the copolyamide has a flexural strength of more than 135 or 140 MPa.

Another aspect of the disclosed process is directed to a molding article produced from the copolyamide of the disclosed process.

Conventionally, transparent resins are used as materials for molded products required to have usual transparency, such as automotive parts, lightning equipment, and electrical parts. In recent years, particularly, the range of applications of the resins as optical materials required to have excellent optical properties has been extended. In particular, an amorphous polyamide resin derived from a structure with polymerized monomers has low birefringence and high transparency, and hence the resin is used as a transparent resin for optical materials, and the like.

However, the amorphous polyamide resin has low stiffness. Therefore, attempts to improve the stiffness of the amorphous polyamide resin molded product have been made by addition of a fiber reinforcing material such as a glass fiber, an inorganic filler, a rubber component, or the like. One disadvantage is that such reinforcements may be detrimental to the optical properties of such resins.

Because the copolyamide of the disclosed process exhibits improved stiffness (e.g., see Table 3), it can be applied as optical materials besides automotive parts, lightning equipment, and electrical parts.

In some embodiments, the copolyamide of the disclosed process can be applied to water resource management/filter technology, e.g., filter cups for pneumatic systems or water treatment, fuel filter cups, pump casings, metering devices, and inspection glasses. It can also be applied to machine and apparatus construction, e.g., flow meters, liquid-level indicators, valve blocks and common control blocks for dispensing and metering equipment, and guide rails. Furthermore, it can be used in electrical/electronic applications, e.g., keys and buttons, and casings for switches relays and counters.

The "Trogamid® T5000" is a semi-aromatic/aliphatic polyamide, a product of Evonik Industries.

As shown in Table 4, the copolyamide of the disclosed process exhibits improved solvent/chemical resistance.

TABLE 4

Solvent Resistance Test (placing polymer pellets in solvent at room temperature)

| | Trogamid ® T5000 | 100:0 MPMD-T:MPMD-I | 60:40 MPMD-T:MPMD-I | 0:100 MPMD-T:MPMD-I |
|---|---|---|---|---|
| Methanol 5 hrs | No crystallization - significant softening (retention of hard inner core in pellets) | Very slight crystallization - sample remained hard | Slight crystallization - sample remained hard | Slight crystallization - significant softening |
| Methanol 16 hrs | No crystallization - significant softening (pellets completely soft) | Very slight crystallization - sample remained hard | Slight crystallization - remained hard but broke up easily in hand | Significant softening and coagulation |
| Methanol 40 hrs | Pellets all coalesced into single gel-like lump (gradually dissolving) | Very slight crystallization - sample remained hard | Slight crystallization - remained hard but broke up easily in hand | Sample fully coagulated (gel-like plug) |
| Ethanol 5 hrs | No crystallization - significant softening and coagulation | Very slight crystallization - sample remained hard | No crystallization - sample remained hard/tough | Slight crystallization - slight softening and coagulation |
| Ethanol 16 hrs | No crystallization - significant softening and coagulation | Very slight crystallization - sample remained hard | No crystallization - sample remained hard/tough | Slight crystallization - pronounced softening and coagulation |

In some embodiments, the copolyamide of the disclosed process can be applied to applications where resistance to low molecular weight alcohols is required, for example fuel filter cups, or filter bowls, where ethanol is present in the gasoline or liquid level indicators when alcohols are present in the liquid.

In some embodiments, the copolyamides of the disclosed process may be preserved in the presence of a solvent. In other embodiments, the copolyamides of the disclosed process may be chemically resistant to a solvent. In one embodiment, the solvent may be a polar solvent. In another embodiment, the solvent may be from a class of common industrial solvents, such as but not limited to, alcohols, ethers, esters, alkanes, nitriles. Examples of common industrial solvents may include methanol, ethanol, isopropanol, propanol, butanol, acetone, acetonitrile, cyclohexane, tetrahydrofuran. In one embodiment, the solvent may be a $C_1$-$C_{10}$ alcohol. In another embodiment, the solvent may be methanol, ethanol, propanol, isopropanol, butanol, pentanol or hexanol.

In some embodiments, the copolyamides of the disclosed process may be preserved in the presence of a solvent for at least about 5 hours. In other embodiments, the copolyamides of the disclosed process may be preserved in the presence of a solvent for at least about 10 hours. In another embodiment, the copolyamides of the disclosed process may be preserved in the presence of a solvent for at least about 16 hours. In yet another embodiment, the copolyamides of the disclosed process may be preserved in the presence of a solvent for at least about 20 hours. In a further embodiment, the copolyamides of the disclosed process may be preserved in the presence of a solvent for at least about 40 hours.

The copolyamides of the disclosed process can be applied to applications, such as, filter technology (filter bowls), electrical and/or electronic components (battery seals, terminal strips, push buttons, casings for relays and switches, connectors, sensors, fuses, etc.), industrial systems such as greasing systems, grease guns, grease hubs, lubricant reservoirs, flowmeters, metering equipment, sight and inspection glasses, guide rails, etc., in optics such as spectacle frames and lenses, safety glasses, sports goggles, medical masks, etc., plumbing components such as brackets, faucets, taps, shower heads, valve housings, pressure reduction valves, etc., furniture and home décor assembly/components such as gears, wheels, clips, etc., and a wide variety of other applications where good chemical and stress resistance are important in addition to excellent processability, mold shrinkage, dimensional stability, molding characteristics, and colorability.

In some embodiments, the copolyamide of the disclosed process may serve as an alternative material to traditional clear thermoplastics such as polycarbonate. In other embodiments, the copolyamide of the disclosed process may serve as an attractive and low-cost material as replacement to transparent polylaurolactamide (nylon 12 or PA12) based systems. In some other embodiments, the copolyamide of the disclosed process may serve as an attractive alternative to transparent nylons, for example nylon 6I/6T, where improved thermal properties ($T_g$ and HDT), lower moisture absorption, and higher stiffness are desirable.

Another aspect of the disclosed process is directed to a method of making a copolyamide comprising MPMD with a mixture of isophthalic acid and terephthalic acid in the presence of a catalyst.

In some embodiments, the catalyst concentration in the mixture of isophthalic acid and terephthalic acid is no more than 0.01 mole %. In other embodiments, the catalyst concentration in the mixture of isophthalic acid and terephthalic acid is no more than 0.0075 mol %. In another embodiment, the catalyst concentration in the mixture of isophthalic acid and terephthalic acid is no more than 0.005 mol %. In yet another embodiment, the catalyst concentration in the mixture of isophthalic acid and terephthalic acid is no more than 0.003 mol %.

In some embodiments, the catalyst is a phosphorus-based catalyst. Examples of suitable phosphorus-based catalyst include, but are not limited to, hypophosphoric acid and it's alkali and alkali-earth metal salts (e.g., sodium hypophosphite), phosphorous acid and it's alkali and alkali-earth metal salts (e.g., monosodium phosphite), phosphoric acid and it's alkali and alkali-earth metal salts (e.g., monosodium phosphonate), alkyl, aryl and alkyl-aryl phenylphosphinic acids (e.g., tolylphosphinic acid) and their alkali and alkali-earth metal salts (e.g., sodium phenylphosphinate or potassium phenylphosphinate), alkyl, aryl and alkyl-aryl phenylphosphonic acids (e.g., tolylphosphonic acid, phenylethylene phosphonic acid or cyclohexylphosphonic acid) and their alkali and alkali-earth metal salts (e.g., sodium phenylphosphonate). In other embodiments, the catalyst may be amine salts (e.g., IIMD or MPMD) of phenylphosphinic acids and phenylphosphonic acids (e.g., HMD tolyiphosphinate). In one embodiment, the catalyst is organophosphites such as triphenylphosphite or Irganox 168. In another embodiment, the catalyst is sodium hypophosphite.

In one embodiment, the catalyst is no more than 1000 ppm of the mixture of isophthalic acid and terephthalic acid (based on weight of phosphorus). In another embodiment, the catalyst is no more than 500 ppm of the mixture of isophthalic acid and terephthalic acid. In yet another embodiment, the catalyst is no more than 400 ppm of the mixture of isophthalic acid and terephthalic acid. In yet another embodiment, the catalyst is no more than 300 ppm of the mixture of isophthalic acid and terephthalic acid. In a further embodiment, the catalyst is no more than 150 ppm of the mixture of isophthalic acid and terephthalic acid.

In some embodiments, MPMD is at least 6 mol % excess than the mixture of isophthalic acid and terephthalic acid. In a further embodiment, MPMD is at least 7 mol % excess than the mixture of isophthalic acid and terephthalic acid.

In some embodiments, the method further comprising mixing MPMD with isophthalic acid and terephthalic acid in water to form an aqueous salt solution and further comprising:
 (a) Stage 1: heating the salt solution at a constant temperature ($T_1$) of at least 130° C. to evaporate the salt solution to a concentration of about 70%;
 (b) Stage 2: heating the about 70% salt solution to a higher temperature ($T_2$) of at least 200° C. and pressure ($P_2$) of at least 200 psia under a closed system;
 (c) Stage 3: gradually distilling water from the solution while the pressure ($P_2$) is held constant and the temperature is increased to $T_3$ of at least 230° C.;
 (d) Stage 4: gradually reducing pressure to atmospheric while the temperature is increased to $T_4$ of at least 260° C.; and
 (e) Stage 5: reducing the pressure by vacuum for at least 15 minutes while the temperature is increased to $T_5$ of at least 280° C.

In one embodiment, stage 1 is conducted at a pressure ($P_1$) higher than atmospheric. In other embodiments, $P_1$ is at least 40, 60, 80, 100, 120, 140, or 160 psia.

In some embodiments, $T_1$ is at least 140, 150, 160, 170, 180, 190, or 200° C. In another embodiment, $T_1$ is from about 130 to about 200° C. In a further embodiment, $T_1$ is from about 180 to about 200° C.

In one embodiment, $T_2$ is at least 205, 210, 215, 220, 225, 230, or 235° C.

In one embodiment, $P_2$ is at least 210, 220, 230, 240, 250, 260 psia.

In some embodiments, $T_3$ is at least 240, 250, 260, or 270° C.

In some embodiments, $T_4$ is at least 265, 270, 275, or 280° C.

In some embodiments, the pressure in stage 5 is reduced to between about 350 and about 750 mbar. In one embodiment, the pressure is reduced to less than 750 mbar. In a further embodiment, the pressure is reduced to less than 600, 500, 400, 350, or 300 mbar.

In some embodiments, $T_5$ is at least 285 or 290° C.

The maximum pressure in all cases is limited by the equipment allowable working pressure to up to 3500 Psig. The maximum temperature in all cases is limited by the thermal decomposition temperature to up to 500° C.

Another aspect of the present disclosure is directed to a method of making a conditioned article comprising:
 i) providing a copolyamide containing about 40 to about 80 mol % 2-methyl-1,5-pentamethyleneterephthalamide ("MPMD-T") units and about 20 to about 60 mol % 2-methyl-1,5-pentamethyleneisophthalamide ("MPMD-I") units;
 ii) producing an article from the copolyamide of i);
 iii) conditioning the article of ii); and
 iv) recovering the conditioned article from iii).

In some embodiments, the conditioning is conducted according to the ISO 1110 method.

General Procedure

The salts used in this process are produced by the gradual addition of MPMD to a mixture of terephthalic and isophthalic acid (of the appropriate ratio) in distilled water (to produce a concentration of 40-50% w/w) at temperatures between 20-60° C. until the pH of the resulting solution is 7.6-7.7. At this point, the excess MPMD is added. The catalyst is added to the salt solution once it is in the autoclave. The catalyst can be an organic or inorganic phosphorus-based acid (in particular, sodium hypophosphite).

In the operation of Stage 1, it is preferred to conduct the distillation at a constant pressure of between 100-150 psia and constant temperature of between 130-200° C.

In the operation of Stage 3, it is preferred to have a constant pressure of between 240-280 psia.

In the operation of Stage 4, it is preferred to reduce the pressure in a single reduction (i.e., not with staged plateaus) process.

In the operation of Stage 5, the polycondensation continues in the melt and is promoted by the use of vacuum to remove residual water from the salt and water of reaction which aids in the building of molecular weight.

Another aspect of the present disclosure is directed to a polyamide blend comprising an aliphatic polyamide and a semi-aromatic polyamide.

Examples of suitable aliphatic polyamides include, but are not limited to, polyhexamethlyeneadipamide (N66), polycaproamide (N6), polyenanthamide (nylon 7), polylaurolactamide (nylon 12), polyundecaneamide (nylon 11), polyhexamethylenedodecamide (nylon 612), and any combination thereof. Examples of preferred aliphatic polyamides include nylon 66 (polyhexamethylenediamine) and nylon 6 (polycaproamide).

In some embodiments, the semi-aromatic polyamide is MPMD-T/MPMD-I, as described previously.

In some embodiments, the semi-aromatic polyamide contains about 50 to about 80 mol % MPMD-T units and about 20 to about 50 mol % MPMD-I units. In a further embodiment, the semi-aromatic polyamide contains about 50 to about 70 mol % MPMD-T units and about 30 to about 50 mol % MPMD-I units. In other embodiments, the semi-aromatic polyamide contains about 60 to about 80 mol % MPMD-T units and about 20 to about 40 mol % MPMD-I units. In some other embodiments, the semi-aromatic polyamide contains about 60 to about 70 mol % MPMD-T units and about 30 to about 40 mol % MPMD-I units.

In some embodiments, the semi-aromatic polyamide units are included in the polyamide blend in an amount in the range from 5 to about 40 wt %, relative to the total composition. Preferably the semi-aromatic polyamide units are included in an amount in the range from about 10 to about 35 wt %, preferably, in the range from about 15 to about 30 wt %, relative to the total composition.

In other embodiments, the content of the semi-aromatic polyamide units in the polyamide blend is carefully controlled so that the resulting blend is semi-crystalline. In one embodiment, it may be possible to improve retention of the mechanical properties, in particular stiffness, of the resulting polyamide blends with MPMD-T/MPMD-I in subsequent processing which involve an increase in temperature. The improvement observed is, in particular, with reference to equivalent blends produced by the same method but formed with amorphous semi-aromatic or partially aromatic polyamides.

In some embodiments, the aliphatic polyamide units are included in an amount of about 95 to about 65 wt %, relative to the total composition. Preferably the aliphatic polyamide units are included in an amount in the range from about 70 to about 90 wt %, relative to the total composition. More preferably the aliphatic polyamide units are included in an amount in the range from about 70 to about 80 wt %, relative to the total composition.

In some embodiments, the presence of semi-aromatic polyamide units in the polyamide blend with MPMD-T/MPMD-I alters the glass transition temperature, $T_g$, of the aliphatic polyamide leading to improved mechanical properties. In other embodiments, improvements in the retention of stiffness at high temperatures of the resulting polyamide blends with MPMD-T/MPMD-I mean that they are useful as unreinforced nylon in applications where heat deflection temperature (HDT), high $T_g$, high stiffness and low moisture absorption are desirable.

In some embodiments, the polyamide blends with MPMD-T/MPMD-I may further comprise one or more additives such as lubricants, glass fillers, mineral fillers, plasticizers, pigments, dyes, antioxidants, heat stabilizers, hydrolysis stabilizers, nucleating agents, flame retardants, blowing agents and combinations thereof.

In some embodiments, polyamide blends with MPMD-T/MPMD-I can be molded at a temperature of less than about 150° C., preferably less than 130° C., and more preferably at water-moldable temperatures of less than 120° C., to produce a molded article having improved physical properties, specifically tensile strength, flexural strength, Impact strength, and other technical properties (e.g., see Tables 6 and 7).

In some embodiments, polyamide blends with MPMD-T/MPMD-I may be produced by melt-blending, in an extruder, an aliphatic polyamide unit with a semi-aromatic polyamide unit. The skilled person will be familiar with melt-blending techniques. Suitable equipment for blending the polyamide and other additives include a twin-screw extruder, melt kneader or batch mixer. The polyamide blends with MPMD-T/MPMD-I may be suitable for compounding or for use as a masterbatch. One or more of the additives discussed above in connection with the polyamide blend with MPMD-T/MPMD-I may be added to the extruder.

In some embodiments, the polymer blend with MPMD-T/MPMD-I may provide articles or parts of commercial use. The article or part may be a molded article or part produced by molding the polyamide blend with MPMD-T/MPMD-I. Advantageously, such molded articles exhibit improved physical properties. Furthermore, it is possible to produce such molded articles using a molding temperature of less than 150° C.

In some embodiments, articles and parts, having the desired shape and form for commercial use, may be produced by applying conventional molding and forming techniques to the polyamides and polyamide compositions of the present disclosure. These techniques may include injection molding, blow molding, molding by extrusion, vacuum or compression forming and like. Therefore, the molded articles or parts meeting the design specification could be used as engineered thermoplastic pieces in installations and assemblies.

Molded articles or parts manufactured from the polyamide blends with MPMD-T/MPMD-I may be desirable in applications that require improved retention of mechanical and stiffness properties in harsh operating environments. Such applications may include (1) metal replacement for automotive applications such as under the hood components (covers, crankcases, timing wheels, manifolds, fan blades, reservoirs, emission control components, fuse boxes, wire harness connectors), power train and chassis (structural parts, fuel lines, transmission components, pedals), interior parts (instrument panels, housing for steering column and airbags, interior trim), exterior components (side molding/cladding, door handles, exterior trim), etc.; (2) electrical and electronics (housing for consumer electronics, connectors, coil forms, solenoids, sensors, switches, switch plates, relays, motors, actuators, lighting drivers, enclosure materials, bobbin supports, contact armature, circuit breakers, etc.); (3) industrial (pumps, pressure valves, gears, sucker rod guides, fittings, bearings, etc.); (4) consumer durables (home appliances such as refrigerators, ranges, dishwasher, blenders, power tools, hand tools, lawn and gardening equipment, etc.); (5) sports and recreation (bike wheels, toys, ski boots, golf club parts, snow mobile housing, etc.); (6) household goods and office equipment (gears, casters, mounting brackets, braces, cable ties, plumbing components, fittings, housings, fixtures, etc.); (7) sanitary applications (water heater components, water filter housing, components for water taps, etc.), and a wide variety of other applications where mechanical strength, chemical resistance, low shrinkage, reduced warpage, etc. are desirable from a durability viewpoint.

In some embodiments, polyamide blends with MPMD-T/MPMD-I may be used in a wide range of specialty films, barrier films and monofilament applications.

In some embodiments, articles or parts made from the polymer blend with MPMD-T/MPMD-I may significantly improve the performance of nylons in humid environments. In other embodiments, articles or parts made from the polymer blend with MPMD-T/MPMD-I may have reduced wall thickness, lighter weight and lower material costs, and yet, with improved stiffness and mechanical strength in humid environments.

In some embodiments, a conditioned article of commercial use may be produced from the polyamide blend with MPMD-T/MPMD-I.

As shown in Tables 6 and 7, an article made from the polyamide blend with MPMD-T/MPMD-I exhibits improved tensile modulus and tensile strength after conditioning. The conditioned polyamide blends with MPMD-T/MPMD-I also exhibit improved flexural modulus and flexural strength than the unconditioned polyamide blend with MPMD-T/MPMD-1.

In some embodiments, the stiffness of the aliphatic polyamide such as nylon 6 and nylon 66 can be retained to higher temperatures to a greater degree than previously possible by blending with amorphous polyamides such as a semi-aromatic copolyamide of poly-hexamethyleneisophthalamide and poly-hexanethylenethyleneterephthalamide; hereinafter called "6I/6T").

Test and Analytical Methods

The following test methods were used for the polymer property determinations:
ISO 527 determination of tensile strength, tensile modulus, elongation at break and yield,
ISO 178 determination of flexural strength and modulus,
ISO 180 determination of Izod impact strength,
ISO 179 determination of Charpy impact strength,
ISO 62 determination of amount of absorbed moisture,
ISO 75 determination of heat deflection temperature (HDT),
ISO 307 (RV) relative viscosity determined using 1% (w/v) solution of polymer in 96% by wt. sulfuric acid at 25° C.,
DSC Differential Scanning Calorimetry for determination of thermal transitions,
ISO 1110 accelerated conditioning of samples (70° C., 62% relative humidity).
ISO 1183 determination of Density
ISO 7724-1 Determination of L*a*b color
ASTM D3418-12 Standard Test Method for Transition Temperatures and Enthalpics of Fusion and Crystallization of Polymers by Differential Scanning Calorimetry.
ISO 6721-1 Plastics—Determination of dynamic mechanical properties.
DMA Dynamic mechanical analysis.
ISO 1183-1 Plastics—Methods for determining the density of non-cellular plastics—Part 1: Immersion method, liquid pyknometer method and titration method.
ASTM D1003 Standard test method for Haze and Luminous Transmittance of Transparent Plastics The following Examples demonstrate the present disclosure and its capability for use. The disclosure is capable of other and different embodiments, and its several details are capable of modifications in various apparent respects, without departing from the scope and spirit of the present disclosure. Accordingly, the Examples are to be regarded as illustrative in nature and not as restrictive. Likewise, the below Examples illustrate non-limiting modes of carrying out the disclosed process with the particular arrangement of the units as described above. All percentages are by weight unless otherwise indicated.

Example 1

This example describes the preparation of an amorphous polyamide from co-polymerization of INVISTA DYTEK® 2-Methylpentamethylenediamine (also called INVISTA DYTEK® A amine; CAS No. 15520-10-2), terephthalic acid (CAS No. 100-21-0) and isophthalic acid (CAS No. 121-91-5).

INVISTA DYTEK® A amine was obtained from INVISTA™ Specialty Intermediates. Table 5 gives a typical composition of DYTEK® amine used.

TABLE 5

| Typical Composition (wt %) | |
|---|---|
| 2-Methylpentamethylenediamine | 99.0 |
| Methylcyclopentanediamine | 0.6 |
| 2-Ethyltetramethylenediamine | 0.3 |
| Water | 0.02 |
| Color (APHA) | 2 |
| Appearance | Clear and free of suspended materials |

The terephthalic acid used was obtained from Lotte Chemicals. A typical composition of the terephthalic acid was 100% terephthalic acid.

The isophthalic acid used was obtained from Eastman Chemicals. A typical composition of the isophthalic acid was 100% isophthalic acid.

The catalyst used during the poly-condensation reaction was sodium hypophosphite monohydrate ("SHP"), obtained from Sigma Aldrich. The SHP used has about 29% by wt. elemental phosphorus.

The Silwet® L-7605 is a polyether silicone, which is used to enhance lubricity with foam control during the polycondensation reaction. Silwet® is a trademark of Momentive Performance Materials Inc.

[I] Preparation of the DYTEK® a Amine Salt of (Terephthalic+Isophthalic) Acids in Aqueous Solution.

This aqueous salt solution is known as the MPMD-T/MPMT-T aqueous salt solution in this and the subsequent Examples 2 through 4.

The preparation was carried out in a 20-Liter glass vessel equipped with an agitator, heating system and temperature measurement device. The preparations were made under the inert, nitrogen environment. About 3455.5 g (20.8 moles) of terephthalic acid and about 8809.0 g of deionized water were sequentially added to the vessel at 23° C. and atmospheric pressure followed by 2417.0 g (20.8 moles) of INVISTA DYTEK® A amine in small additions with stirring until the pH of the solution was 7.7. In a separate vessel, about 1177.0 g (7.08 moles) of isophthalic acid and about 3000.0 g of deionized water were sequentially added to the vessel at 23° C. and atmospheric pressure followed by about 823.0 g (7.09 moles) of INVISTA DYTEK® A amine in small additions with stirring until the pH of the solution was 7.7. These two solutions were mixed together before a 211.0 g (7.0% excess by molar) addition of DYTEK® A amine to bring the pH of the solution to 9.8.

The above preparation obtained the 40% strength MPMD-T/MPMD-I aqueous salt solution having 80/20 (mol %) terephthalic/isophthalic acid contents in the mixture.

About 18.4 kg of the above-prepared 40% strength MPMD-T/MPMD-I aqueous salt solution was charged to a 24-liter metal autoclave fitted with a mechanical agitator, heating and cooling system (jacket) and a thermocouple for bulk temperature measurement. About 6.5 g of SHP was added to attain about 266 ppmw level in the autoclave mixture based on the contained phosphorus weight. About 2.2 g of Silwet® L-7605 was added to the autoclave mixture to attain about 40 ppmw concentration in the mixture. The autoclave mixture was stirred at 70 RPM at 25° C. temperature.

[II] Polycondensation in an Autoclave.

The Following Stages were Carried Out in Succession:

Stage 1: While stirring at 70 RPM, temperature of the above autoclave mixture from [I] containing 40% strength MPMD-T/MPMD-I aqueous salt solution was gradually increased to about 190° C. The autoclave head pressure during this time began to increase due to the water evaporation. The pressure of the autoclave was maintained at about 170 psia while the water present in the reaction mixture was steadily distilled out of the autoclave. The water in the autoclave mixture was evaporated to attain approximately 70% strength MPMD-T/MPMD-I aqueous salt solution by maintaining about 192-201° C. temperature and about 170 psia pressure over about 50 minutes.

Stage 2: The autoclave mixture containing 70% strength MPMD-T/MPMD-I aqueous salt solution from Stage 1 was further heated to about 217° C. temperature over approximately 6 minutes while stirring continued at 80 RPM. The autoclave head pressure was gradually increased to about 265 psia. The control vent valve was shut to prevent vapor loss and to allow pressure to build.

Stage 3: The autoclave mixture from Stage 2 continued a further temperature increase to about 258° C. over approximately 75 minutes. The autoclave head pressure was maintained to about 265 psia while the temperature gradually increased and more water steadily distilled out of the autoclave. The autoclave reaction mass was continuously stirred at 80 RPM. The control vent value was regulated to allow vapor loss whilst maintaining the autoclave pressure at target.

Stage 4: The autoclave head pressure was gradually relieved to about atmospheric pressure over about 20-30 minutes and the temperature of the reaction mass from Stage 3 was simultaneously increased to about 282° C. During this process, the autoclave reaction mass was continuously stirred at 55 RPM.

Stage 5: With continuous stirring at 15 RPM, the autoclave head pressure was gradually reduced from the Stage 4 pressure to about 350 mbar [5 Psia] using an air-tight vacuum pump and maintained at that value for approximately 25 minutes. During this time, the temperature was simultaneously increased to about 285-290° C. to finish the polycondensation reaction.

Once the 25-minute vacuum cycle was completed in Stage 5, stirring was stopped and the molten polymer mass was cast from the autoclave as a lace into a water bath before chipping. The recovered polymer was of yellow color, transparent and of uniform consistency. The polymer obtained in this example was analyzed to exhibit 1.94 RV, 34 AEG [Amine End Groups], Glass Transition temperature, $T_g$, of 147° C. by DSC and HDT (at 1.8 MPa) of 122° C.

Example 2

This example describes the preparation of a polymer starting from a 40% strength MPMD-T/MPMD-I aqueous salt solution having 70/30 (molar) terephthalic/isophthalic acid contents in the mixture.

Preparation of the MPMD-T/MPMD-I aqueous salt solution was carried out using the ingredients and process described in Example 1, and by using the following material quantities:

About 3021.0 g (26 moles) of INVISTA DYTEK® A amine (plus 7 mol % DYTEK® A amine excess of 211.0 g), about 3024.0 g (18.2 moles) of terephthalic acid, about 1296.0 g (7.80 moles) of isophthalic acid and about 11011.0 g of deionized water. As in Example 1, the salt solutions were prepared in separate batches before being mixed together and the excess DYTEK® A amine added.

The five-stage polycondensation method described in Example 1 was carried out using the prepared 40% strength MPMD-T/MPMD-I aqueous salt solution having 70/30 (molar) terephthalic/isophthalic acid contents in the mixture. The recovered polymer was of yellow color, transparent and of uniform consistency. The polymer obtained in this example was analyzed to exhibit 1.90 RV, 36 AEG, Glass Transition temperature, $T_g$, of 145° C. by DSC and HDT (at 1.8 MPa) of 121° C.

Example 3

This example describes the preparation of a polymer starting from a 40% strength MPMD-T/MPMD-I aqueous salt solution having 60/40 (molar) terephthalic/isophthalic acid contents in the mixture.

Preparation of the MPMD-T/MPMD-I aqueous salt solution was carried out using the ingredients and process described in Example 1, and by using the following material quantities:

About 3021.0 g (26 moles) of INVISTA DYTEK® A amine (plus 7 mol % DYTEK® A amine excess of 211.0 g), about 2592.0 g (15.6 moles) of terephthalic acid, about 1728.0 g (10.4 moles) of isophthalic acid and about 11011.0 g of deionized water. As in Example 1, the salt solutions were prepared in separate batches before being mixed together and the excess DYTEK® A amine added.

The five-stage polycondensation method described in Example 1 was carried out using the prepared 40% strength MPMD-T/MPMD-I aqueous salt solution having 60/40 (molar) terephthalic/isophthalic acid contents in the mixture. The recovered polymer was of yellow color, transparent and of uniform consistency. The polymer obtained in this example was analyzed to exhibit 2.04 RV, 46 AEG, Glass Transition temperature, $T_g$, of 145° C. by DSC and HDT (at 1.8 MPa) of 122° C.

Example 4—Comparative

This comparative example describes the preparation of a polymer starting from a 40% strength aqueous salt solution having 0/100 (molar) terephthalic/isophthalic acid contents in the mixture.

Preparation of the aqueous salt solution was carried out using the ingredients and process described in Example 1, and by using the following material quantities:

About 3021.0 g (26 moles) of INVISTA DYTEK® A amine (plus 7 mol % DYTEK® A excess of 211.0 g), about 4319.0 g (26 moles) of isophthalic acid and about 11011.0 g of deionized water.

The five-stage polycondensation method described in Example 1 was carried out using the prepared 40% strength aqueous salt solution having 0/100 (molar) terephthalic/isophthalic acid contents in the mixture. The recovered polymer was of yellow color, transparent and of uniform consistency. The polymer obtained in this example was analyzed to exhibit 1.76 RV, 52 AEG, Glass Transition temperature, $T_g$, of 136° C. by DSC and HDT (at 1.8 MPa) of 117° C.

Table 2 represents the mechanical testing data obtained for the polymers prepared in Examples 1 through 4.

In Tables 6 and 7 below and in the Figures, "DT/DI" refers to MPMD-T/MPMD-I. "6I/6T" refers to a semi-aromatic copolyamide of polyhexamethylene isophthalamide and polyhexamethyleneterephthalamide. The 6I/6T resin is commercially available from EMS-Grivory (labeled "G21"). "35% GF PA 66" refers to a 35 wt % glass-fiber filled polyamide 66 base resin. "35% GF PA 66+6I/6T" refers to a polyamide blend comprising of 35 wt % glass-fiber filled polyamide 66 and 6I/6T components. In the tables, the 75:25 (w:w) nylon 6 and nylon 66 based blends with either MPMD-T/MPMD-I or 6I/6T have the corresponding "Nylon 6" and "Nylon 66" labeling.

Figure 1:
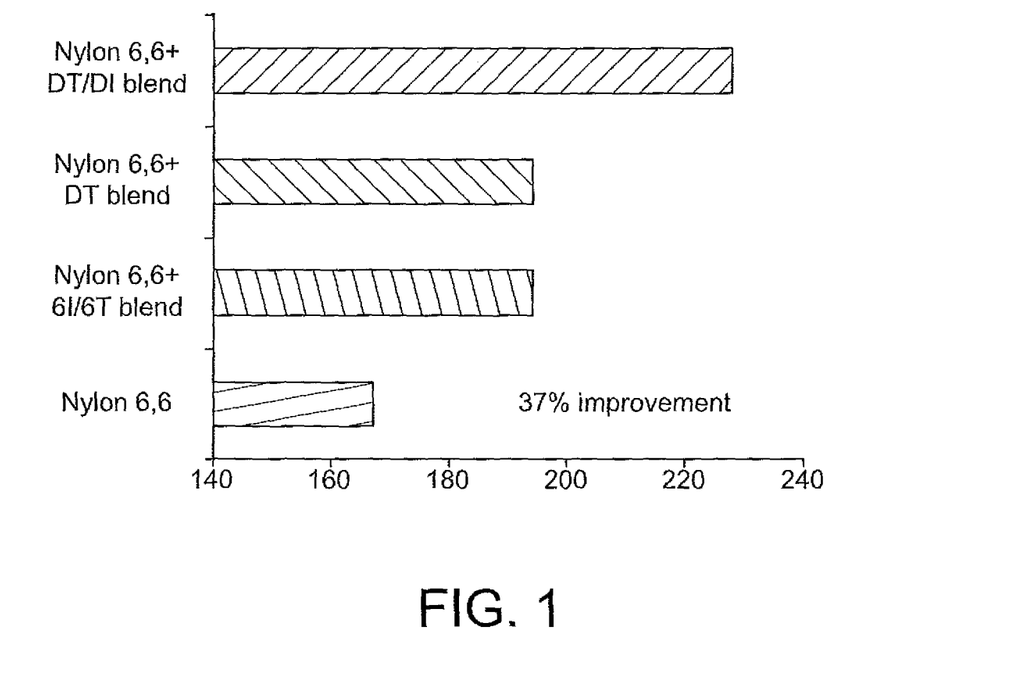
FIG. 1 represents flexural stress (MPa) at 3.5% strain data for conditioned articles in humid environment (ISO 1110), and prepared according to the Examples of this disclosure.
Figure 2:
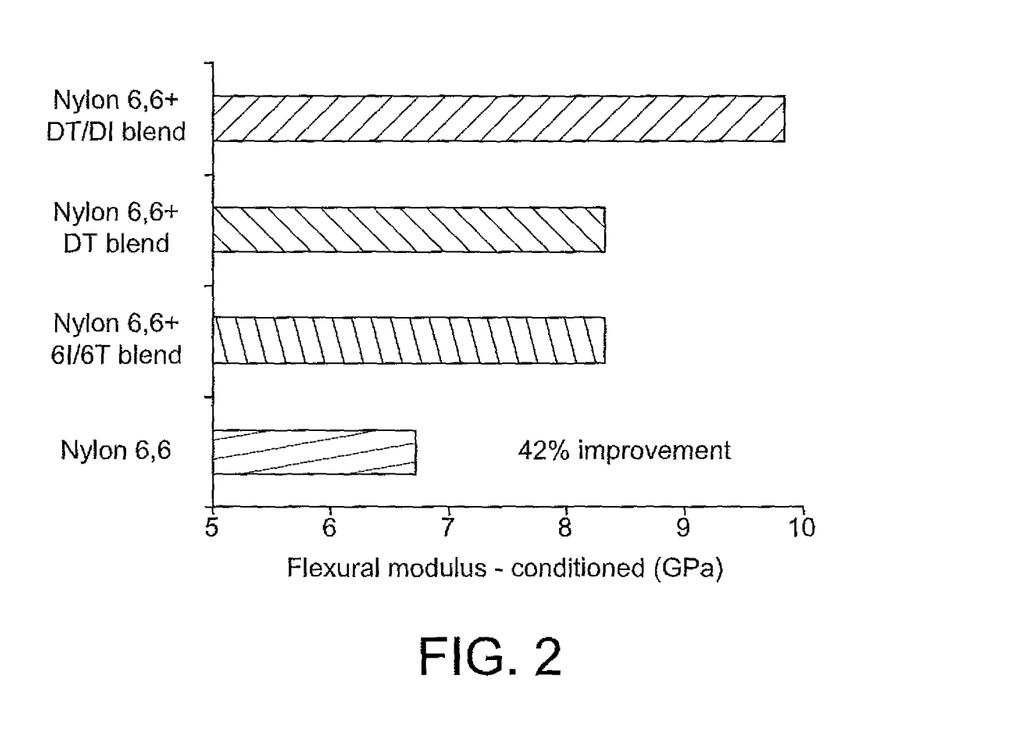
FIG. 2 represents flexural modulus data (GPa) for conditioned articles in humid environment (ISO 1110), and prepared according to the Examples of this disclosure.
Figure 3:
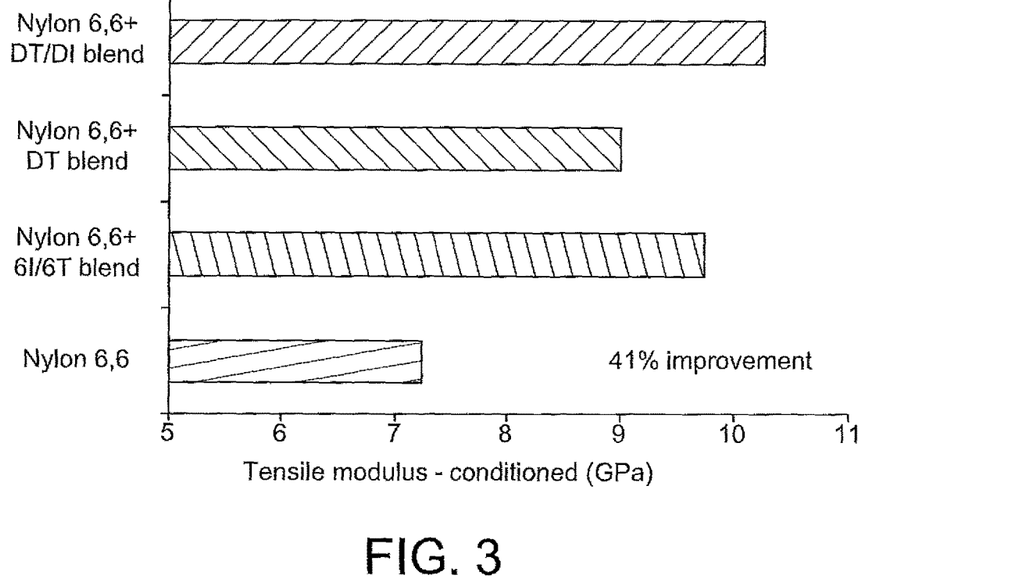
FIG. 3 represents tensile modulus data (GPa) for conditioned articles in humid environment (ISO 1110), and prepared according to the Examples of this disclosure.

FIGS. 1-3 illustrate improved mechanical properties of a 35% glass-fiber resin compound with resin ratio of 75% by wt. nylon 66 and 25% by wt. semi-aromatic copolyamide MPMD-T/MPMD-I, prepared according to the present disclosure. An improvement of at least 37% is observed versus a conventional nylon 66 (35% glass-fiber filled).

Figure 4:
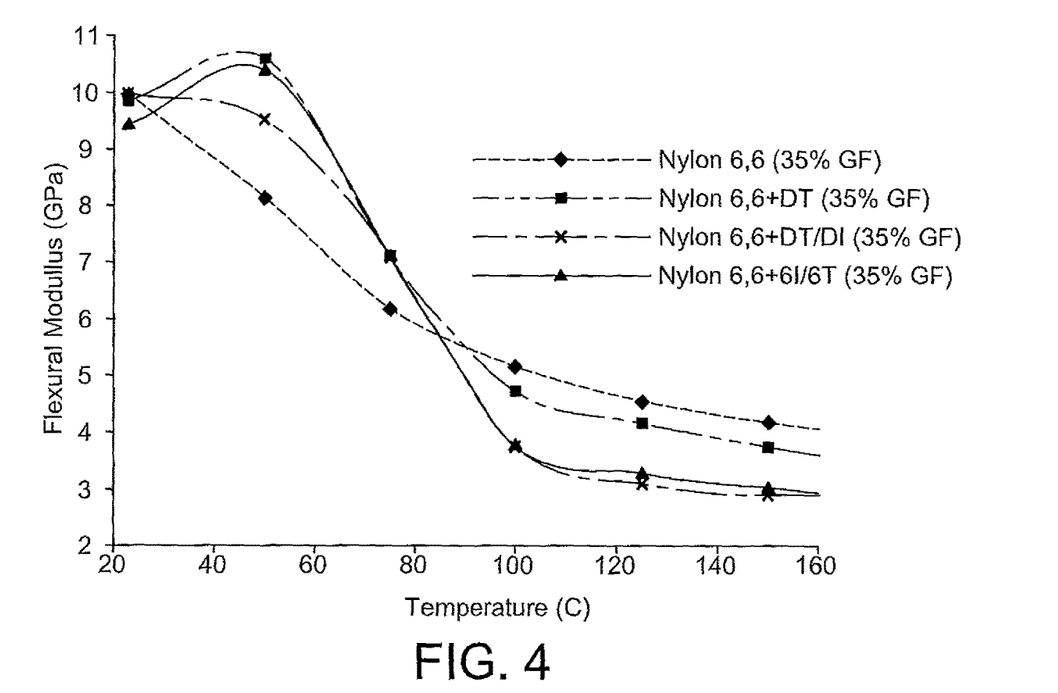
FIG. 4 represents flexural modulus data (GPa) for articles prepared according to the Examples of this disclosure, and at increasing temperatures.
Figure 5:
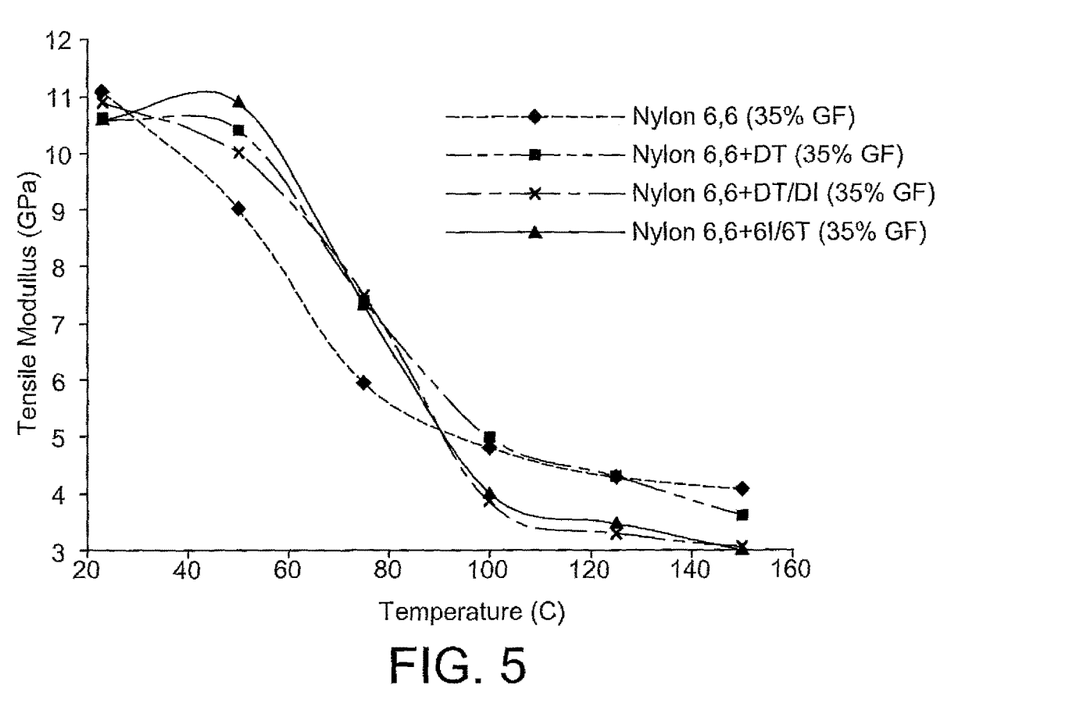
FIG. 5 represents tensile modulus data (GPa) for articles prepared according to the Examples of this disclosure, and at increasing temperatures.

FIGS. 4 and 5 illustrate improved mechanical strength and stiffness of a 35% glass-fiber resin compound with resin ratio of 75% by wt. nylon 66 and 25% by wt. semi-aromatic copolyamide MPMD-T/MPMD-I, prepared according to the present disclosure and at increasing temperature.

Figure 6:
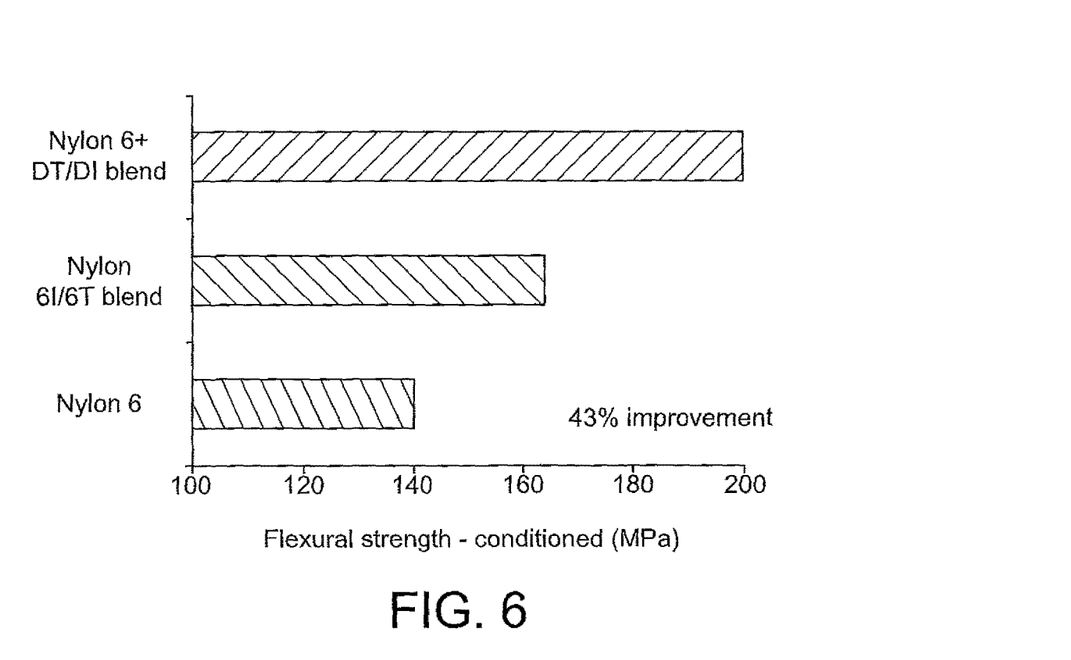
FIG. 6 represents flexural strength (MPa) at 3.5% strain data for conditioned articles in humid environment (ISO 1110), and prepared according to the Examples of this disclosure.
Figure 7:
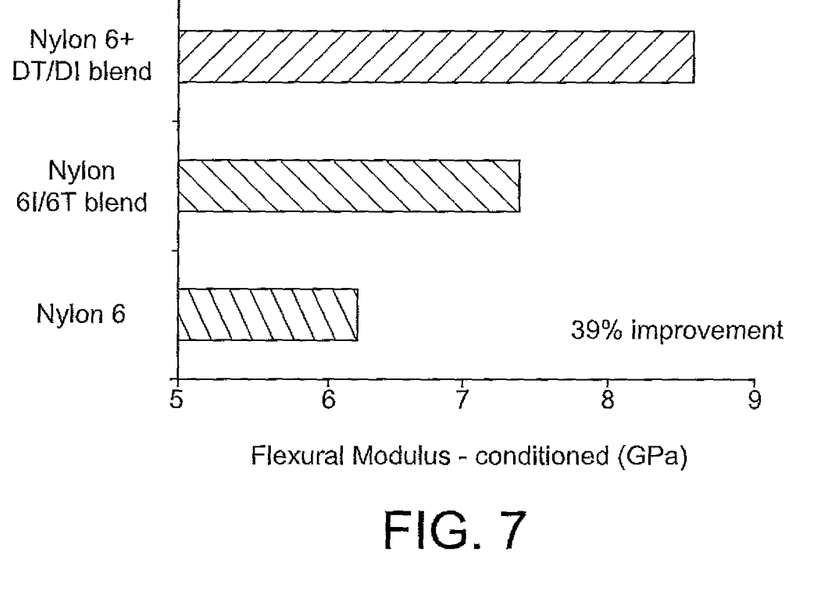
FIG. 7 represents flexural modulus data (GPa) for conditioned articles in humid environment (ISO 1110), and prepared according to the Examples of this disclosure.
Figure 8:
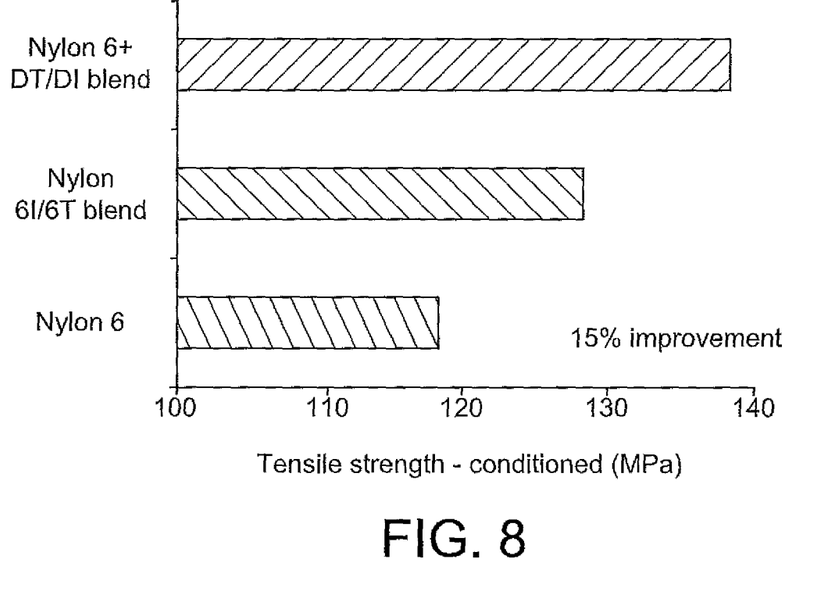
FIG. 8 represents tensile modulus data (GPa) for conditioned articles in humid environment (ISO 1110), and prepared according to the Examples of this disclosure.

FIGS. 6-8 illustrate improved mechanical properties of a 35% glass-fiber resin compound with resin ratio of 75% by wt. nylon 6 and 25% by wt. semi-aromatic copolyamide MPMD-T/MPMD-I, prepared according to the present disclosure. A flexural strength @ 3.5% strain improvement of 43% is observed versus a conventional nylon 6 (35% glass-fiber filled). A flexural modulus improvement of 39% is observed versus a conventional nylon 6 (35% glass-fiber filled). A 15% tensile strength improvement is observed versus a conventional nylon 6 (35% glass-fiber filled).

Figure 9:
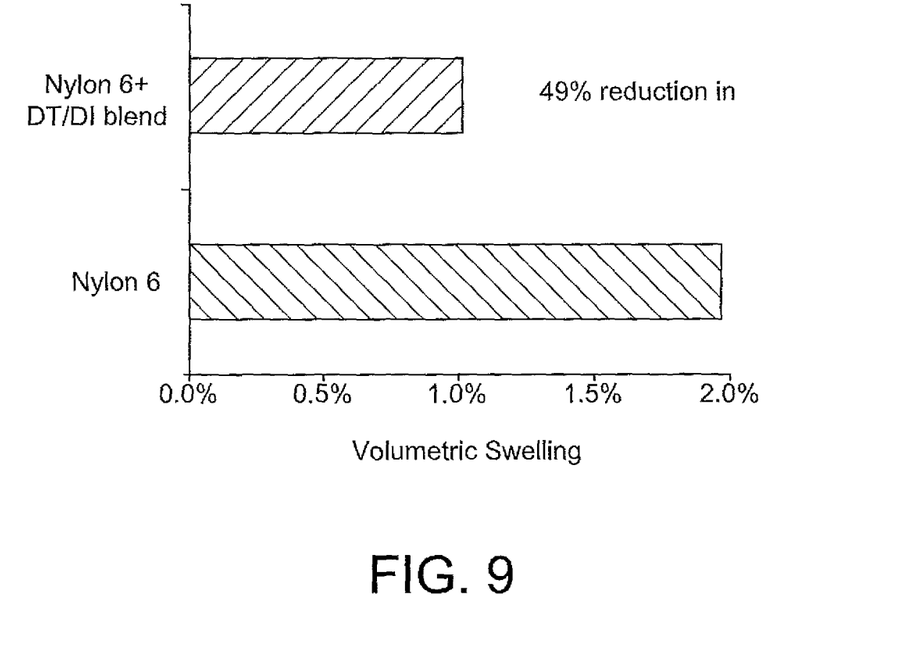
FIG. 9 represents dimensional stability data for articles prepared according to the Examples of this disclosure, and in humid environment (ISO 1110).

FIG. 9 illustrates improved dimensional stability of a 35% glass-fiber resin compound with resin ratio of 75% by wt. nylon 6 and 25% by wt. semi-aromatic copolyamide MPMD-T/MPMD-I, prepared according to the present disclosure. The volumetric swell is reduced by almost half versus a conventional nylon 6 (35% glass-fiber filled).

Figure 10:
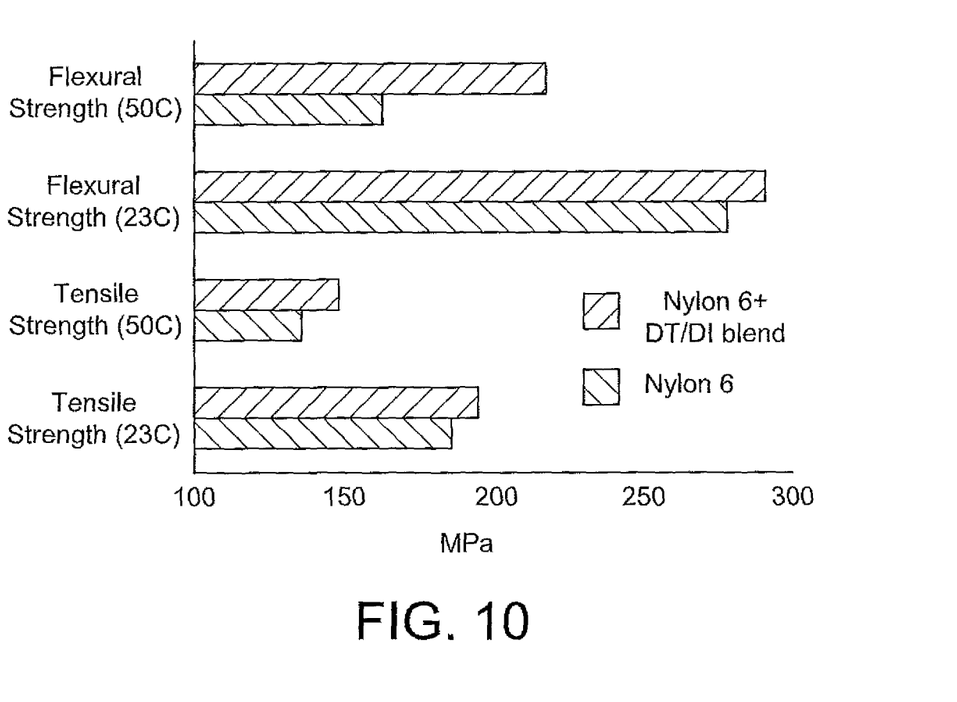
FIG. 10 represents tensile and flexural strength data (MPa) for articles prepared according to the Examples of this disclosure, and at ambient and moderately elevated temperatures.
Figure 11:
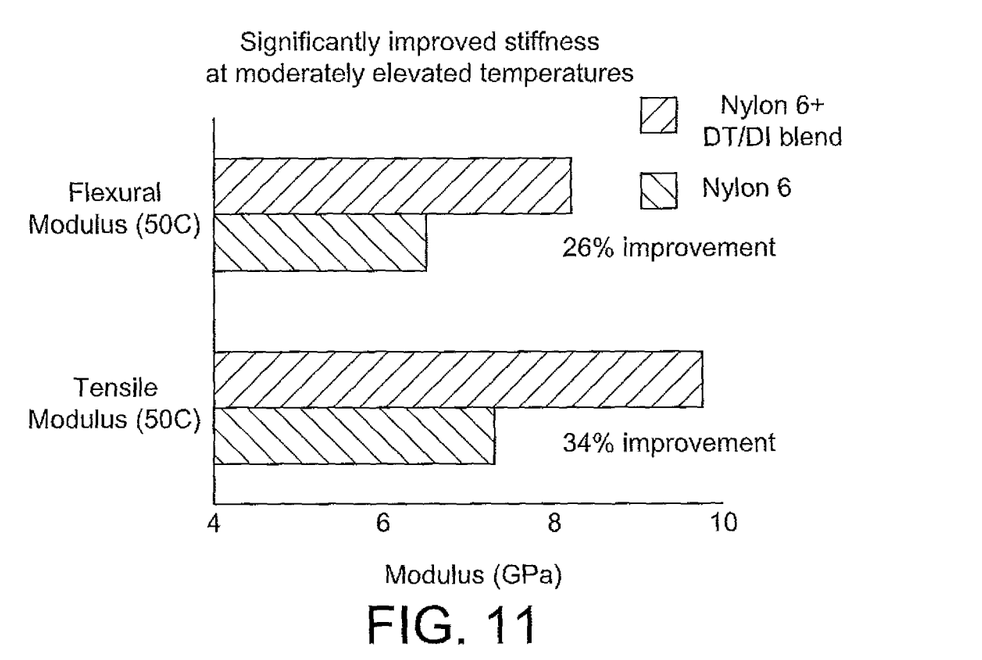
FIG. 11 represents tensile and flexural modulus data (GPa) for articles prepared according to the Examples of this disclosure, and at moderately elevated temperature.

FIGS. 10 and 11 illustrate improved mechanical strength and stiffness of a 35% glass-fiber resin compound with resin ratio of 75% by wt. nylon 6 and 25% by wt. semi-aromatic copolyamide MPMD-T/MPMD-I, prepared according to the present disclosure and at increasing temperature. At 50° C. temperature, improvements in tensile modulus and flexural modulus are observed to be 34% and 26%, respectively, versus a conventional nylon 6 (35% glass-fiber filled).

TABLE 6

Nylon 66 Blends - Technical Properties

| Property | Test Method | 35% GF Nylon 66 | | 35% GF Nylon 66 + MPMD-T/MPMD-I 75:25 (w:w) | | 35% GF Nylon 66 + 6I/6T 75:25 (w:w) | |
|---|---|---|---|---|---|---|---|
| | | DAM | Cond | DAM | Cond | DAM | Cond |
| Melting Temperature (° C.) | ASTM D3418-12 (DSC) | 265 | | 264 | | | |
| Glass Transition Temperature (° C.) | ISO 6721-1 (DMA) | 87 | | 108 | | 102 | |
| Tensile Modulus (GPa) | ISO 527-1,2 | 11.1 | 7.3 | 10.9 | 10.2 | 10.6 | 9.8 |
| % retention of tensile modulus after conditioning | | | 66 | | 94 | | 92 |
| Tensile Strength (MPa) | ISO 527-1,2 | 174 | 118 | 180 | 135 | 183 | 133 |
| % retention of tensile strength after conditioning | | | 68 | | 75 | | 73 |
| Elongation @ Break (%) | ISO 527-1,2 | 4.5 | 6.6 | 4.1 | 4.2 | 5.0 | 6.3 |
| Flexural Modulus (GPa) | ISO 178 | 10.0 | 6.7 | 10.2 | 9.6 | 9.4 | 8.2 |
| % retention of flexural modulus after conditioning | | | 67 | | 94 | | 87 |
| Flexural Stress @ 3.5% strain | ISO 178 | 270 | 167 | — | 228 | | 194 |
| Flexural Strength (MPa) | ISO 178 | 275 | 193 | 269 | 232 | 271 | 209 |
| % retention of flexural strength after conditioning | | | 70 | | 86 | | 77 |
| Impact Strength (kJ/m$^2$) (Notched Izod, 23° C.) | ISO 180 | 9.8 | 12.5 | 8.5 | 8.1 | 9.0 | 9.3 |
| HDT @ 1.8 MPa (° C.) | ISO 75 | 251 | — | 224 | — | | |
| HDT @ 0.45 MPa (° C.) | ISO 75 | 262 | — | 253 | — | | |
| Density (g/cm$^3$) | ISO 1183-1 | 1.41 | 1.42 | 1.42 | 1.43 | | |
| Moisture absorption (%) | ISO 1110 | | 1.95 | | 2.08 | | |

DMA = Dynamic mechanical analysis
DAM = dry as molded; all mechanical tests performed at 23° C.
Cond = conditioned as per ISO 1110 (70° C., 62% RH) to equilibrium; all mechanical tests performed at 23° C.
GF = glass fiber

TABLE 7

Nylon 6 Blends - Technical Properties

| Property | Test Method | 35% GF Nylon 6 DAM | 35% GF Nylon 6 Cond | 35% GF Nylon 6 + MPMD-T/MPMD-I 75:25 (w:w) DAM | 35% GF Nylon 6 + MPMD-T/MPMD-I 75:25 (w:w) Cond | 35% GF Nylon 6 + 6I/6T 75:25 (w:w) DAM | 35% GF Nylon 6 + 6I/6T 75:25 (w:w) Cond |
|---|---|---|---|---|---|---|---|
| Melting Temperature (° C.) | DSC (20° C./min) | 221 | | 218 | | | |
| Glass Transition Temperature (° C.) | ISO 6721-1 (DMA) | 62 | | 87 | | 84 | |
| Tensile Modulus (GPa) | ISO 527-1,2 | 10.9 | 6.2 | 10.8 | 8.5 | 10.5 | 7.2 |
| % retention of tensile modulus after conditioning | | | 57 | | 79 | | 69 |
| Tensile Strength (MPa) | ISO 527-1,2 | 187 | 118 | 196 | 136 | 195 | 128 |
| % retention of tensile strength after conditioning | | | 63 | | 69 | | 65 |
| Elongation @ Break (%) | ISO 527-1,2 | 3.8 | 7.5 | 3.6 | 6.0 | 3.5 | 8.4 |
| Flexural Modulus (GPa) | ISO 178 | 9.5 | 6.1 | 9.5 | 8.5 | 9.5 | 7.3 |
| % retention of flexural modulus after conditioning | | | 64 | | 89 | | 77 |
| Flexural Strength @ 3.5% Strain (MPa) | ISO 178 | 278 | 140 | 291 | 200 | 292 | 164 |
| % retention of flexural strength after conditioning | | | 50 | | 69 | | 56 |
| Impact Strength (kJ/m2) (Notched Izod, 23° C.) | ISO 180 | 14 | 23 | 12 | 14 | 13 | 16 |
| HDT @ 1.8 MPa (° C.) | ISO 75 | 207 | 195 | 180 | 155 | | |
| HDT @ 0.45 MPa (° C.) | ISO 75 | 220 | 218 | 215 | 215 | | |
| Density (g/cm$^3$) | ISO 1183-1 | 1.41 | 1.41 | 1.42 | 1.43 | | |
| Volumetric swelling (%) | ISO 1110 | | 1.97 | | 1.01 | | |

DMA = Dynamic mechanical analysis
DAM = dry as molded; all mechanical tests performed at 23° C.
Cond = conditioned as per ISO 1110 (70° C., 62% RH) to equilibrium; all mechanical tests performed at 23° C.
GF = glass fiber

What is claimed is:

1. A composition comprising from about 65 to about 95 wt. % of an aliphatic polyamide and a copolyamide containing about 40 to about 60 mol % 2-methyl-1,5-pentamethyleneterephthalamide ("MPMD-T") units and about 40 to about 60 mol % 2-methyl-1,5-pentamethyleneisophthalamide ("MPMD-I") units,
wherein the copolyamide has a relative viscosity ("RV") of more than 1.90, and
wherein the copolyamide has a glass transition temperature of at least 145° C.

2. The composition of claim 1, wherein the copolyamide contains about 50 to about 60 mol % MPMD-T units and about 40 to about 50 mol % MPMD-I units.

3. The composition of claim 1, wherein the tensile strength of the copolyamide is more than 80 MPa.

4. The composition of claim 1, wherein the notched Izod impact strength of the copolyamide is more than 5 kJ/m$^2$.

5. The composition of claim 1, wherein the unnotched Izod impact strength of the copolyamide is more than 30 kJ/m$^2$.

6. The composition of claim 1, wherein the copolyamide has a tensile modulus of more than 3.0.

7. The composition of claim 1, wherein the copolyamide has a flexural modulus of more than 3.0.

8. The composition of claim 1, wherein the copolyamide has a flexural strength of more than 130.

9. The composition of claim 1, wherein, in the presence of a solvent, the copolyamide is preserved.

10. The composition of claim 9, wherein the solvent is a polar solvent.

11. The composition of claim 9, wherein the solvent is an alcohol.

12. The composition of claim 11, wherein the solvent is methanol, ethanol, propanol, butanol, pentanol or hexanol.

13. The composition of claim 9, wherein the copolyamide is preserved in the presence of a solvent for at least 5 hours.

14. A composition comprising polymeric resins in a ratio of from about 65 to about 95 wt. % of an aliphatic polyamide and from about 5 to about 40 wt. % of a copolyamide containing about 40 to about 60 mol % 2-methyl-1,5-pentamethyleneterephthalamide ("MPMD-T") units and about 40 to about 60 mol % 2-methyl-1,5-pentamethyleneisophthalamide ("MPMD-I") units,
wherein the copolyamide has a relative viscosity ("RV") of more than 1.90, and
wherein the copolyamide has a glass transition temperature of at least 145° C.

15. The composition of claim 14, wherein the copolyamide is present from about 10 to about 35 wt. %.

16. The composition of claim 14, wherein the copolyamide is present at from about 15 to about 30 wt. %.

17. The composition of claim 14, wherein the aliphatic polyamide is selected from the group consisting of polyhexamethyleneadipamide (N66), polycaproamide (N6), polyenanthamide (nylon 7), polylaurolactamide (nylon 12), polyundecaneamide (nylon 11), polyhexamethylenedodecamide (nylon 612), and combinations thereof.

18. The composition of claim 1, further comprising a reinforcing material selected from glass fiber, inorganic filler or a rubber component.

19. The composition of claim 14, further comprising a reinforcing material selected from glass fiber, inorganic filler or a rubber component.

20. The composition of claim 18, wherein the reinforcing material is glass fiber.

21. The composition of claim 19, wherein the reinforcing material is glass fiber.

22. The composition of claim 1, wherein the composition as-molded is transparent.

23. The composition of claim 14, wherein the composition as-molded is transparent.

24. The composition of claim 14, wherein, in the presence of a solvent, the copolyamide is preserved.

* * * * *